United States Patent
Chen et al.

(10) Patent No.: US 6,694,856 B1
(45) Date of Patent: Feb. 24, 2004

(54) MAGNETORHEOLOGICAL DAMPER AND ENERGY DISSIPATION METHOD

(75) Inventors: Peter C. Chen, Clarksville, MD (US); Norman Wereley, Potomac, MD (US)

(73) Assignees: The University of Maryland, College Park, MD (US); Systems Planning and Analysis, Greenbelt, MD (US)

( * ) Notice: Subject to any disclaimer, the term of this patent is extended or adjusted under 35 U.S.C. 154(b) by 0 days.

(21) Appl. No.: 10/079,565

(22) Filed: Feb. 22, 2002

Related U.S. Application Data
(60) Provisional application No. 60/270,162, filed on Feb. 22, 2001, now abandoned.

(51) Int. Cl.[7] ............................................... F41A 25/04
(52) U.S. Cl. ..................................................... 89/43.01
(58) Field of Search .............................. 89/43.01, 43.02

(56) References Cited

U.S. PATENT DOCUMENTS

| | | | |
|---|---|---|---|
| 2,899,194 A | * 8/1959 | Zumwalt | |
| 4,648,306 A | * 3/1987 | Zielinski | 89/43.02 |
| H1010 H | * 1/1992 | Kasten et al. | 89/43.01 |
| 5,492,312 A | 2/1996 | Carlson | 267/140.14 |
| 5,531,150 A | * 7/1996 | Gegaregian et al. | 89/43.01 |
| 5,549,837 A | 8/1996 | Ginder et al. | 252/62.52 |
| 5,553,514 A | 9/1996 | Walkowc | 74/574 |
| 5,582,385 A | 12/1996 | Boyle et al. | 248/550 |
| 5,632,361 A | 5/1997 | Wulff et al. | 188/267 |
| 5,652,704 A | 7/1997 | Catanzarite | 248/550 |
| 5,712,783 A | 1/1998 | Catanzarite | 280/707 |
| 5,878,851 A | * 3/1999 | Carlson et al. | 188/269 |
| 5,878,997 A | 3/1999 | Miesner | 188/267.1 |
| 5,961,899 A | 10/1999 | Rossetti et al. | 264/40.1 |
| 5,964,455 A | 10/1999 | Catanzarite et al. | 248/550 |
| 5,984,056 A | 11/1999 | Agnihotri et al. | 188/267.2 |
| 5,992,582 A | 11/1999 | Lou et al. | 188/267.1 |
| 5,993,358 A | 11/1999 | Gureghian et al. | 482/54 |
| 6,007,345 A | 12/1999 | Francis et al. | 439/34 |
| 6,009,982 A | 1/2000 | Agnihotri et al. | 188/267 |
| 6,070,681 A | 6/2000 | Catanzarite et al. | 180/89.15 |
| 6,152,272 A | 11/2000 | Agnihotri et al. | 188/267.2 |
| 6,158,470 A | * 12/2000 | Ivers et al. | 137/807 |
| 6,202,806 B1 | 3/2001 | Sandrin et al. | 188/267.1 |
| 6,260,675 B1 | 7/2001 | Muhlenkamp | 188/267 |
| 6,260,676 B1 | 7/2001 | Agnihotri et al. | 188/267.2 |
| 6,279,700 B1 | 8/2001 | Lisenker et al. | 188/267.1 |
| 6,279,701 B1 | 8/2001 | Namuduri et al. | 188/267.2 |
| 6,290,033 B1 | 9/2001 | Oliver | 188/267.1 |
| 6,296,088 B1 | 10/2001 | Carlson | 188/267.2 |
| 6,311,110 B1 | 10/2001 | Ivers et al. | 701/38 |
| 6,311,810 B1 | 11/2001 | Hopkins et al. | 188/267.2 |
| 6,318,519 B1 | 11/2001 | Kruckemeyer et al. | 188/267 |
| 6,318,520 B1 | 11/2001 | Lisenker et al. | 188/267 |
| 6,336,535 B1 | 1/2002 | Lisenker | 188/267.2 |

FOREIGN PATENT DOCUMENTS

JP 63-289351 * 11/1988

* cited by examiner

Primary Examiner—Stephen M. Johnson
(74) Attorney, Agent, or Firm—Dykema Gossett PLLC

(57) ABSTRACT

Disclosed is a high-speed, high-force impulse load damper susceptible to adaptive control including a cylinder, a piston defining in the cylinder a volume, a coil, fixed relative to the cylinder, configured to generate a magnetic field, and a fluid channel, configured to be influenced by the magnetic field, for one or both of providing fluid to and evacuating fluid from the volume. Also disclosed is a damper including a cylinder, a piston defining in said cylinder a first volume and a second volume, a first fluid channel for one or both of providing fluid to and evacuating fluid from the first volume, first means for regulating flow through said first fluid channel, a second fluid channel for one or both of providing fluid to and evacuating fluid from the second volume, and second means for regulating flow through said second fluid channel, wherein said first fluid channel and said second fluid channel are in fluid communication. Further disclosed is a method of damping with a damper, having a cylinder and a piston defining in the cylinder a first volume and a second volume, including causing negative fluid pressure to resist a tendency of the piston from increasing the first volume, an d causing positive fluid pressure to resist a tendency of the piston from decreasing the second volume. Additionally disclosed is a gun system including a gun, a gun mount, and means for dissipating energy of a force exerted by the gun against the mount, wherein the means for dissipating is adjustable for dissipating different amounts of energy.

16 Claims, 10 Drawing Sheets

MAGNETORHEOLOGICAL DAMPER AND ENERGY DISSIPATION METHOD

REFERENCE TO EARLIER APPLICATION

This Application incorporates and claims the benefit of U.S Provisional Application No. 60/270,162, filed Feb. 22, 2001, now abandoned by P.C. Chen entitled Magnetorheological Damper and Damping Method.

GOVERNMENT RIGHTS

This invention was made with U.S. Government support under Contract No. DAAD17-01-C-0008 awarded by the Army Research Laboratory. The U.S. Government has certain rights in the invention.

BACKGROUND OF THE INVENTION

Many devices, such as turreted artillery, aircraft landing gear, various kinds of reciprocating machinery, vehicle shock absorbers and struts, seismic event attenuation devices, etc., undergo or isolate severe impulse loading, that is high loading over very short durations. Proper handling of these loading conditions typically is essential to the survival, if not the proper functioning of the device. For example, the accuracy of stabilized turreted, rapid-fire gun systems is limited by the structural flexibility of the gun barrel and the gun mounting structure. To improve the accuracy of sustained rounds, high frequency recoil forces that excite the structural dynamics of the turret must be dissipated. Although artillery applications are referred to prominently herein, the principles and embodiments of the invention described below apply to any application with respect to which severe impulse loading is of concern.

Referring to FIG. 1, some high-caliber, rapid-fire guns G employ damping systems D to damp recoil forces transmitted to the gun mounting structure, or fork F, along a direction T that is generally aligned with gun trajectory. Typically, damping systems D rely on passive dampers.

As shown in FIG. 2, a passive damper 10 typically includes a cylinder 15, having a chamber that contains a working fluid. A piston 25 has a head 30, received in chamber 20, and a piston rod 35 extending from head 30 and through an aperture 40 in cylinder 15. The head 30 is moveable within the cylinder between ends 31 and 32, and typically has apertures or valves (not shown) that pass working fluid as head 30 moves against the working fluid. Alternatively, head 30 and chamber 20 may define a narrow passage (not shown) through which the working fluid passes.

Cylinder 15 defines a first eye 45, or other mounting convention, for installation to fork F. Piston rod 35 terminates in a second eye 50, or other mounting convention, for installation to gun G. A first spring retainer 55, connected to cylinder 15, and a second spring retainer 60, connected to piston rod 35, retain a recoil spring (not shown in FIG. 2, but see recoil spring 165 in FIG. 6) that biases piston 30 relative to cylinder 15 into a battery position.

When gun G discharges, gun G recoils with a force that urges piston 30 and cylinder 15 to translate relatively, against a restoring force of the recoil spring 62 and the viscous force of the working fluid against which piston 30 works. As piston 30 works against the working fluid, the working fluid becomes heated in an amount corresponding to the work. Thus, the energy associated with a recoil force is converted into or dissipated in the form of heat.

Energy dissipation directly corresponds to the viscosity of the working fluid. Viscosity is a measure of the resistence of fluid to angular deformation. That is, as viscosity or fluid resistence increases, the amount of work which a piston must undertake to move relative to the associated cylinder increases. Increasing the work that the piston exerts against the fluid increases the heat content or temperature of the fluid. The amount of heat generated and dispersed by the working fluid directly corresponds to the amount of recoil energy dissipated. In other words, increasing the viscosity of the working fluid which, during recoil, causes the piston to generate more heat in the working fluid, results in dissipating more energy of the recoil.

If the amount of energy a damper dissipates is too little, gun G recoils against forks F with an impact that can distort the forks F, adversely effecting gun accuracy, and can damage the forks F, associated electronics and other non-isolated physical structures. Large loads not damped, but transferred to, for example, the frame of a helicopter or other mobile gun transport, also will adversely impact transport handling properties or render the transport unstable or uncontrollable. If the amount of energy dissipated is too much, the gun recoil may be insufficient to compress the recoil spring, which in turn may prevent the gun from returning to the battery position. If gun G does not return to the battery position, gun G may not be able to expel spent cartridges, receive a new round or may experience other failures. Accordingly, energy dissipation must be carefully managed or predicted so that gun G is more accurate and does not prematurely breakdown due to inadequate recoil energy dissipation, or fail due to overly aggressive energy dissipation.

Passive dampers can not adequately damp guns because the amount of energy which passive dampers dissipate generally remains constant, whereas the recoil energy varies. A typical passive damper employs a working fluid that has a generally fixed or predictable viscosity. Fixed viscosity results in generally constant energy dissipation. Accordingly, a working fluid selected for a passive damper may be appropriate for damping a minimum anticipated recoil energy. In order to ensure that a recoil spring returns a gun to battery position. The amount of damping provided in such arrangements generally falls well short of most recoils realized. Consequently, less than an optimal amount of recoil energy is dissipated by the fluid. On the other hand, the amount of recoil energy realized varies according to factors such as round temperature, age, production facility, etc. Consequently, guns and gun mounts experience higher recoil forces than necessary, which introduces structural instabilities that adversely impacts accuracy. Guns and gun mounts also wear much faster than if equipped with more effective damping.

Although not in the context of artillery, dampers exist that provide for varying damping. Some variable dampers include actuated valves for controlling, thereby impacting effective damping, of the damper. However, these dampers rely on moving components to adjust damping, which is cumbersome and not readily adaptable to rapid extreme impulse loads.

Other variable dampers eliminate the mechanical viscosity control components by utilizing active working fluids having viscous properties that change under the influence of electric or magnetic fields. Active fluids, such as Magnetorheological (MR) and Electrorheological (ER) fluids, have the unique ability to change properties when electric or magnetic fields are applied thereacross, respectively. This change mainly is manifested as a substantial increase in the dynamic yield stress, or apparent viscosity, of the fluid.

MR fluids are preferred because of their superior performance. For example, as compared to ER fluids, MR fluids possess an order of magnitude higher yield stress and a much wider operating temperature range. Specifically, the COTS MR fluid, VersaFlo™ by the Lord Corporation, is far less sensitive to contaminants than ER fluids and can be operated in a temperature range from −40 to 150 degrees Celsius. A key advantage of MR fluids is that they require activation voltages of less than 100 volts, an order of magnitude less than ER fluids. This low-voltage operation capability is particularly attractive where heavy power amplifiers cannot be accommodated. In summary, the advantages of MR fluids derive from their ability to provide robust, rapid response interfaces between electronics controls and mechanical systems in real time.

MR devices, such as rotary brakes and linear displacement dampers have been commercialized. However, while the overall use of MR fluid in these devices has increased, both in terms of effectiveness and creativity, the analytical modeling and systematic design aspects have lagged. To a large extent, this can be attributed to the complex phenomenological behavior of these fluids.

MR fluids exhibit nonlinear effects due to applied field, applied load, strain amplitude, and frequency of excitation in dynamic displacement conditions. FIG. 3A is a schematic drawing of the COTS Lord Rheonetics™ damper, white FIG. 3B shows representative test data obtained from this device. The plots show the force vs. piston displacement and force vs. velocity behavior of typical MR damper designs as a function of applied field. The total energy dissipated by the damper is represented by the area within the hysteresis cycles on the force vs. displacement plot in FIG. 4. As greater excitation voltages are applied, more energy is dissipated by the MR damper. This hysteretic response, in addition to the variable damper yield force, as shown in the force vs. velocity plots in FIG. 5, may be exploited in a full-scale flow mode damper for large, rapid fire guns to dissipate energy and to damp the dynamic response of the gun system.

Like most MR and ER dampers available, the COTS Lord Rheonetics™ damper provides constant field excitation, for constant damping control, rather than variable, rapidly controllable, adaptive excitation field control for optimal damping. Consequently, COTS Lord Rheonetics™ dampers, although tunable to trace any of the hysteresis curves, when employed in a device, can only trace one of the hysteresis curves due to a constant applied field.

In the development of the analysis of the recoil adapters, some consideration must be made as to the complexity of the underlying fluid mechanics analysis. The magnetorheological (MR) fluids to be used in the adapters are composed of a suspension of micron sized iron particles in a carrier fluid, typically silicone oil. In the following discussion, it must be realized that the physics of the flow through an MR damper are straightforward: high shear rate Poisieulle flow through an annular valve. The annular valve can be simplified to a rectangular valve using a small ratio assumption, that is, the ratio of the gap to the radius of the annular valve is small or $$d/r \ll 1 \tag{1}$$

Thus, three options exist for developing an analysis of the flow through the annular valve: (1) particle interaction models, (2) continuum models, and (3) rheological models. The particle interaction models have a high computation load, thus are not helpful in modeling this complex. The continuum models only pertain to pre-yield behavior, thus are not particularly helpful in controlling a system that yields. However, the rheological models seem to be most useful for this application because such treat the fluid in bulk, rather that as individual particles; and relate the shear stress to the shear rate.

The three most useful rheological models are: (1) Bingham-plastic, (2) Herschel-Bulkley, and (3) an Eyring-Prandtl-Re constitutive model. The first two models produce relationships between damper velocity and damper force. These models are limited to quasi-steady conditions. However, further research will lead to extending these models to a broader range of conditions. The Eyring model only allows for velocity to be expressed in terms of the force, and thus is not as useful a tool for as the other mentioned models. It is useful to summarize these models and to describe their deficiencies.

The Bingham-plastic constitutive model can be expressed as:

$$\tau = \tau_y sgn(\dot{\gamma}) + \mu \dot{\gamma} \tag{2}$$

A key point is that this model assumes that the fluid flows once the local shear stress has exceeded the dynamic yield stress, $\tau_y$, and the resulting viscous shear stress is additive and proportional to the strain rate, $\dot{\gamma}$, through the plastic or differential viscosity, $\mu$. If the local shear stress is less than the dynamic yield stress, then the fluid does not flow, but is assumed to be rigid. Derivation of the damper force vs. velocity characteristic is the subject of Wereley and Pang (1998). The resulting discontinuity when transitioning across the zero shear rate condition leads to difficulties in dynamic modeling, but the Bingham-plastic model its more than adequate for design in the sense of predicting damping or energy dissipation of devices. A second problem with this model is that the post-yield viscosity is assumed to be constant, which is not the case in practice.

On the other hand, the Herschel-Bulkley model more accurately captures the post yield behavior of the fluid, in that the viscosity can vary as a fractional derivative of the shear rate as below $$\tau = \tau_y sgn(\dot{\gamma}) + K \dot{\gamma}^n \tag{3}$$

It should be noted that the preyield behavior of the Bingham-plastic and Herschel-Bulkley models is the same. Derivation of the damper force vs. velocity characteristic is the subject of Lee and Wereley (1999). The Herschel-Bulkley model can be expressed as a Bingham plastic model $$\tau = \tau_y sgn(\dot{\gamma}) + \mu_a \dot{\gamma} \tag{4}$$

where the apparent viscosity introduced here is now a function of shear rate $$\mu_a = K \dot{\gamma}^{n-1} \tag{5}$$

This model is very useful in the analysis of dampers. The final model to be summarized is the Eyring model. This model has a constitutive equation of $$\tau = \frac{1}{K} \sinh^{-1}\left(\frac{\dot{\gamma}}{\xi}\right) + \mu \dot{\gamma} \tag{6}$$

This model most accurately accounts for low strain rate behavior.

Based on rheometer tests performed in the Smart Structures Laboratory at Maryland and elsewhere, the Herschel-Bulkley performs slightly better over the range of shear rates (>30,000/second) that are of interest to this project.

All of the above models can be used to better predict fluid behavior and can be used as the basis for the analysis of dampers. However, it should be appreciated that additional terms must be added to the various models to accurately model the particular damper in question, such as: seal friction, bushing friction, nonlinear spring,effect of the pneumatic reservoir.

Referring to FIG. 6, an exemplary active MR damper 100 includes a cylinder 115, having a chamber 120 that contains an MR fluid. A piston 125 has a head 130, received in chamber 120, and a piston rod 135 extending from head 130 and through an aperture 140 in cylinder 115. A first spring retainer 155, connected to cylinder 115, and a second spring retainer 160, connected to piston rod 135, retain a recoil spring 165 that biases piston 125 relative to cylinder 115.

Referring also to FIG. 7, head 130 includes a bobbin 170 which retains one or more electric coils 175, each for selectably generating a magnetic field 180. A flux return 177, mounted on head 130, encircles and defines with bobbin 170 a fluid channel 185 configured to course the MR fluid between annular apertures 127 in head 130 through an active region or zone of influence 190 of magnetic field 180. When coil 175 energized, magnetic field 180 causes the MR fluid within active region 190 to assume a higher viscosity or resistance to flow, as described above. Piston 125 essentially "tears" or shears the MR fluid as piston 125 moves relative to cylinder 115.

At least portions of bobbin 170 and flux return 177 which are influenced by magnetic field 180 should be, but as practical matter are entirely, constructed from a high permeability magnetic steel material that will not become permanently magnetized over time. Otherwise, coursing the MR fluid through a fluid channel defined by a magnetized structure would activate the MR fluid and diminish the viscosity range or ability to alter the viscosity thereof.

As shown, when bobbin 170 supports more than one coil 175, adjacent coils 175 are wound so as to generate adjacent active regions 190 having like polarity, thereby defining an enhanced active region.

A disadvantage of damper 100 is that significant portions thereof must be constructed from expensive high permeability magnetic steel material. Another disadvantage with damper 100 is that, with coils 175 fixed to piston 125, delicate electrical wires 178 that energize coils 175 reciprocate with piston 125, which may cause premature failure.

Some devices avoid both problems by fixing the coils in a relatively small fluid valve constructed from a high permeability magnetic steel material. See, for example, U.S. Pat. No. 5,993,358, issued Nov. 30, 1999, to R. S. Gureghian et al, entitled Controllable Platform Suspension System for Treadmill Decks and the like and Devices Therefor. However, such valves are contained in complex fluid systems, rather than in a conventional fluid damper. Also, such fluid systems also are not substantial enough for damping gun recoil forces.

MR damper control systems have been used to damp See, for example, U.S. Pat. No. 5,582,385, issued Dec. 10, 1996, to F. P. Boyle et al., entitled Method for Controlling Motion Using an Adjustable Damper; U.S. Pat. No. 5,964,455, issued Oct. 12, 1999, to D. M. Catanzarite et al., entitled Method for Auto-Calibration of a Controllable Damper Suspension System; and U.S. Pat. No. 6,311,110, issued Oct. 30, 2001, to D. E. Ivers et al, entitled Adaptive Off-State Control Method. However, none of these methods provide for managing energy dissipation, rather intend to eliminate the energy entirely.

To obtain more advantageous damping, gun dampers should provide variable damping for varying recoil energy dissipation as needed. To this end, damped gun systems should include variable dampers. Although a variable MR damper may be able to provide variable damping which more advantageously dissipates energy as needed, the damping provided also must be tailored to dissipate the specific energy associated with a particular round. To this end, the gun system should include an active damping system, wherein the damping of the MR damper is controlled based on the actual energy content of the round. What are needed, and not taught or suggested in the art, are an active, high-speed, high impulse damper and damping method.

SUMMARY OF THE INVENTION

The invention overcomes the disadvantages noted above by providing an active, high-speed, high impulse damper and damping method.

The invention provides a damper including a cylinder, a piston defining in the cylinder a volume, a coil, fixed relative to the cylinder, configured to generate a magnetic field, and a fluid channel, configured to be influenced by the magnetic field, for one or both of providing fluid to and evacuating fluid from the volume.

The invention also provides a damper including a cylinder, a piston defining in said cylinder a first volume and a second volume, a first fluid channel for one or both of providing fluid to and evacuating fluid from the first volume, first means for regulating flow through said first fluid channel, a second fluid channel for one or both of providing fluid to and evacuating fluid from the second volume, and second means for regulating flow through said second fluid channel, wherein said first fluid channel and said second fluid channel are in fluid communication.

The Invention further provides a method of damping with a damper, having a cylinder and a piston defining in the cylinder a first volume and a second volume, including causing negative fluid pressure to resist a tendency of the piston from increasing the first volume, and causing positive fluid pressure to resist a tendency of the piston from decreasing the second volume.

The invention additionally provides a gun system including a gun, a gun mount, and means for dissipating energy of a force exerted by the gun against the mount, wherein the means for dissipating is adjustable for dissipating different amounts of energy.

The invention yet also provides a control system for controlling recoil forces produced in an automatic rapid fire gun mounted on a support and having a variable damping characteristic mounted between the gun and the support, the damper employing an electrically or magnetically active working fluid. According to the invention, the fluid may have a viscosity characteristic which varies in response to an applied electric or magnetic field. In an exemplary embodiment, a damper is employed including such fluid having a variable viscosity characteristic responsive to an applied magnetic or electrical signal. The fluid exhibits a first viscosity characteristic when electrically or magnetically activated and exhibits a second viscosity characteristic lower than the first viscosity characteristic when deactivated. The viscosity characteristic varyies in accordance with the output levels of the applied signal. A force measuring sensor responsively coupled to the gun produces signal indicative of the recoil force of the gun. An electrical circuit responsively coupled to force measuring sensor and operatively coupled to the damper produces an output signal having a selected output level, operative for activating the fluid in accordance there, for varying in real time the viscosity characteristic of the fluid and thereby varying the damping characteristic of the damper.

The invention provides for reducing the number of coils needed in an MR damper, thereby reducing overall inductance in the associated magnetic circuit, thereby reducing the time constant of the circuit.

The invention also provides for reducing the overall number of turns in a coil to achieve the appropriate levels of magnetic field, thereby reducing the time constant and allowing faster MR fluid response. This reduces the complexity of manufacture and weight. The more efficient use of electrical power in the channel reduces the amount of power required it also allows the use of smaller coils which result in better response characteristics, in particular, with respect to the circuit time constant.

The invention provides for increasing the active length of a fluid channel by employing a C-shaped annular fluid channel which pneumatically amplifies the effectiveness of the device, thereby enabling a more compact design, and permitting the pneumatic reservoir to provide additional volume. Additional pneumatic reservoir volume, in turn, allows for a longer piston stroke and reduces the amount of expensive MR or ER fluid needed.

The invention provides for reducing weight and cost of an MR damper by substantially reducing the volume of high permeability magnetic steel required in activatable regions of the damper.

The invention provides for improving the mechanical force vs. velocity performance characteristics.

The invention provides improved elements and arrangements thereof, for the purposes described, which are inexpensive, dependable and effective in accomplishing intended purposes of the invention. Other features and advantages of the present invention will become apparent from the following description of the preferred embodiments which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

Figure 1:
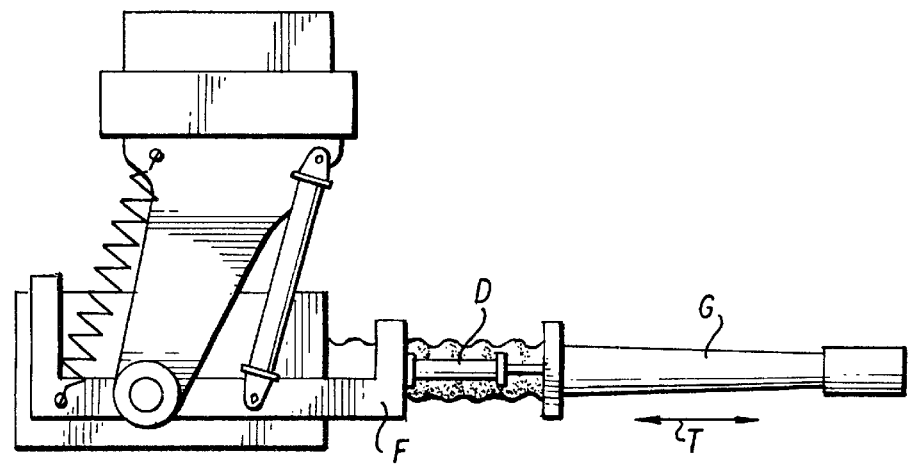
FIG. 1 is schematic view of a gun, gun mount and recoil damper.
Figure 2:
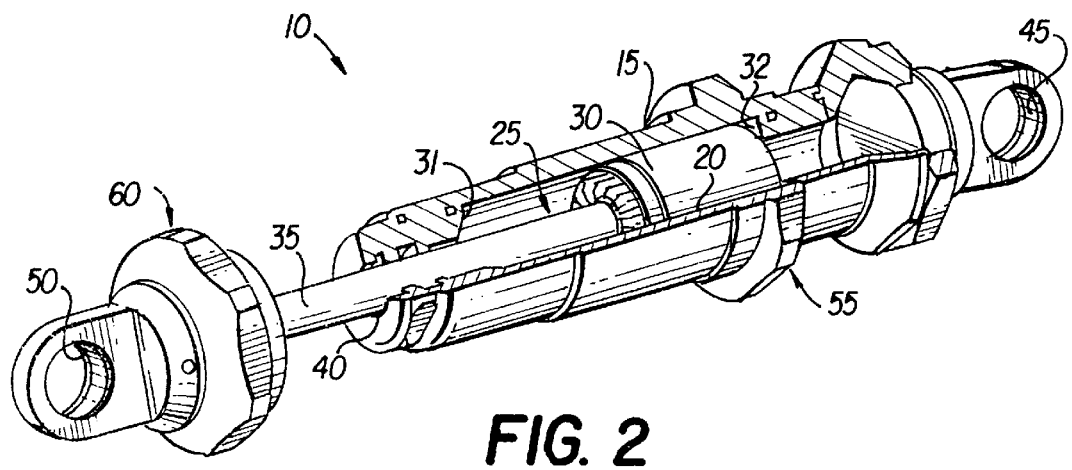
FIG. 2 is a top front right perspective view of an embodiment of a passive damper.
Figure 3:
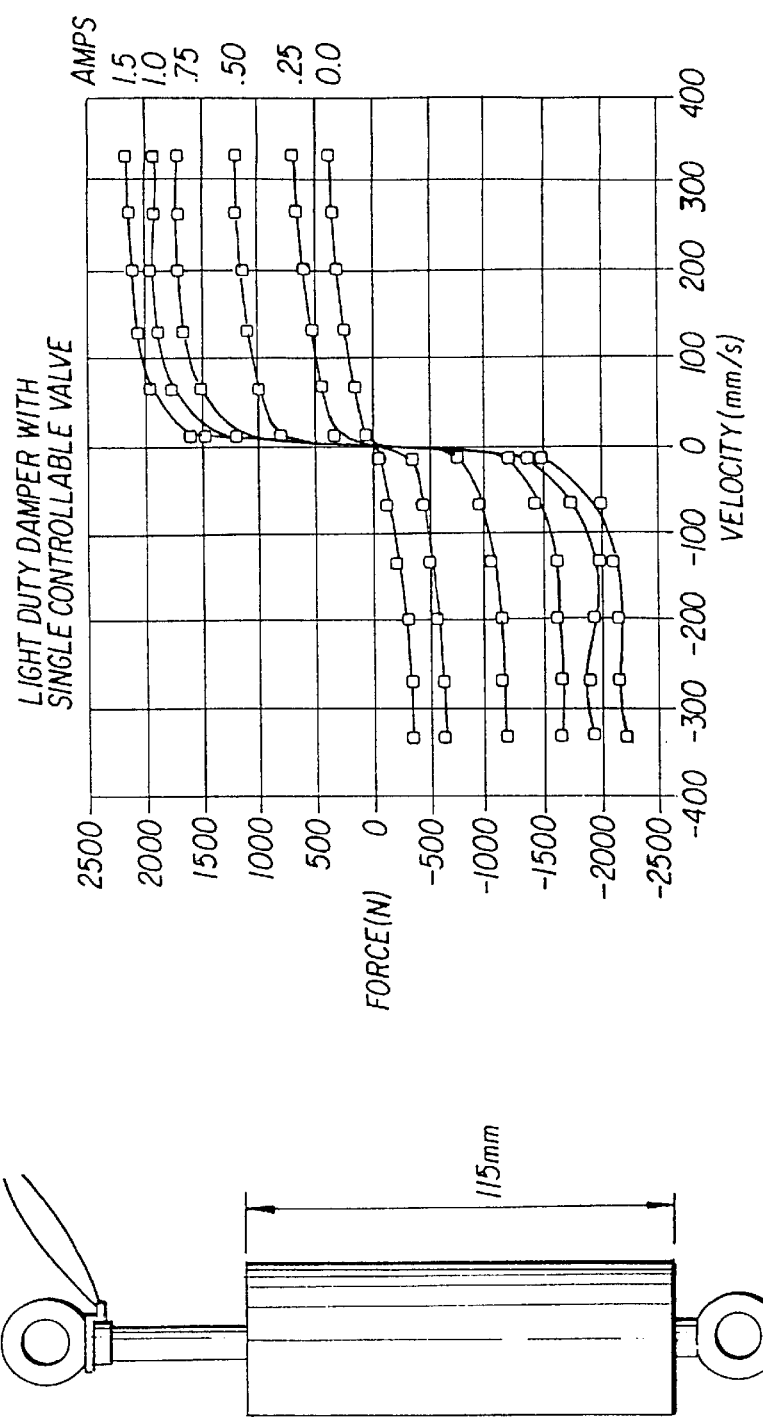
FIGS. 3A and 3B are a schematic view of a fluid test cylinder and a graphical view showing a force vs. velocity with respect to damping at various applied currents.
Figure 4:
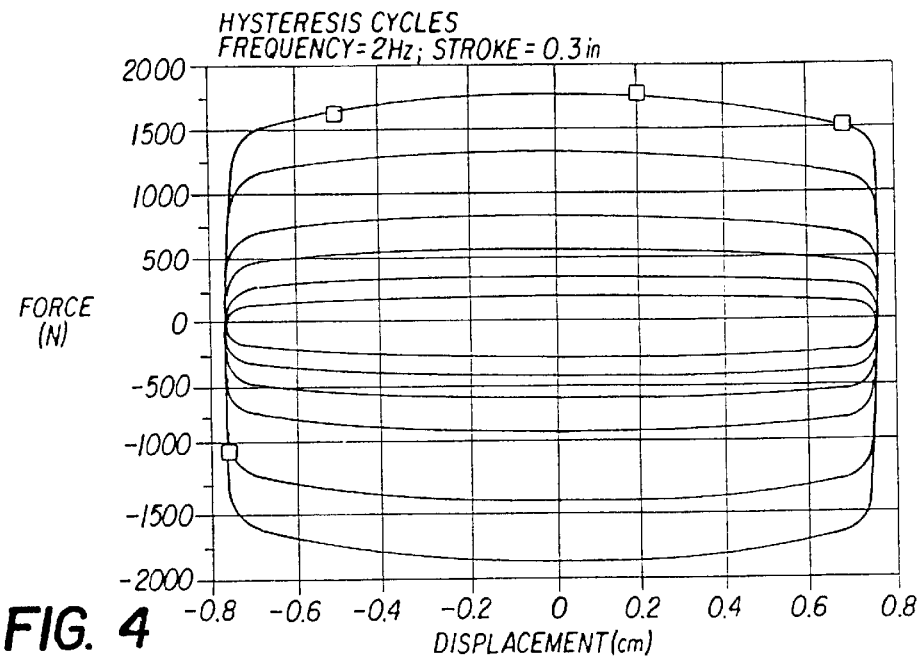
FIGS. 4 and 5 are graphical views of hysteresis cycles respectively with respect to displacement and velocity.
Figure 5:
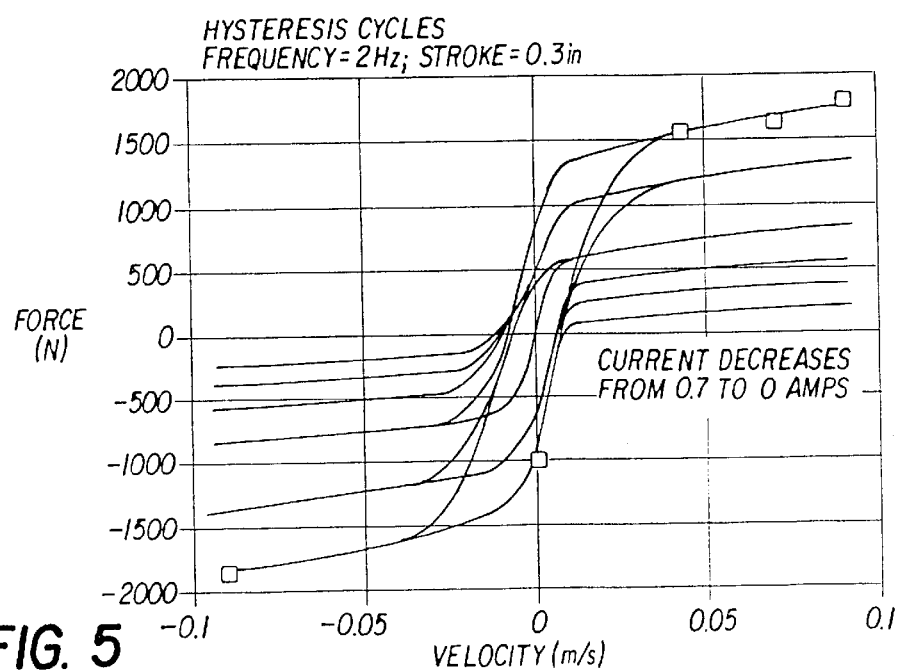
Figure 6:
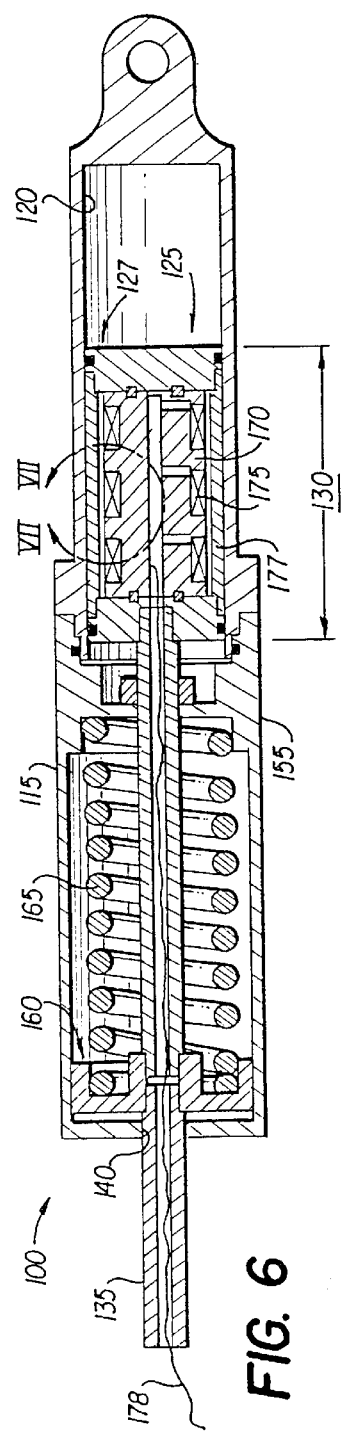
FIG. 6 is a schematic view of an embodiment of an MR damper.
Figure 7:
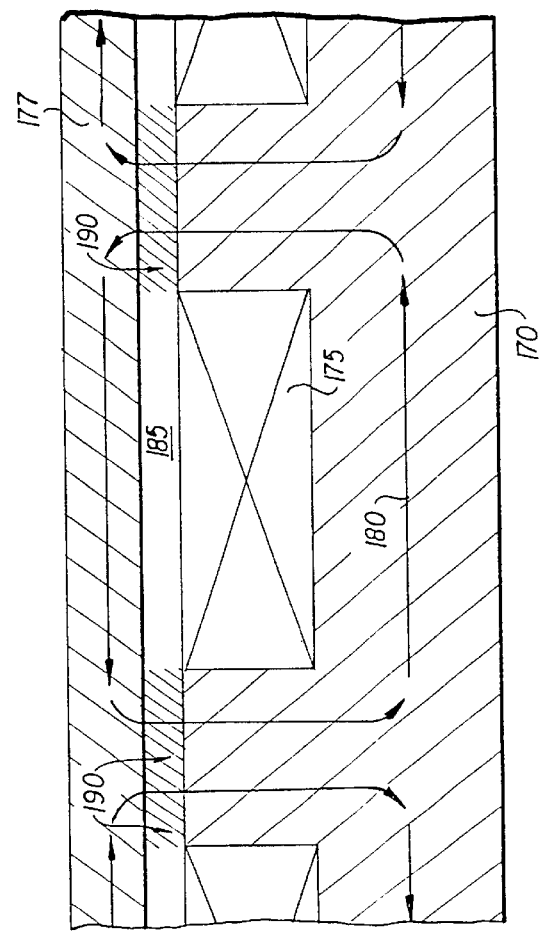
FIG. 7 is a schematic view of a portion within line VII of the embodiment of FIG. 6.
Figure 8:
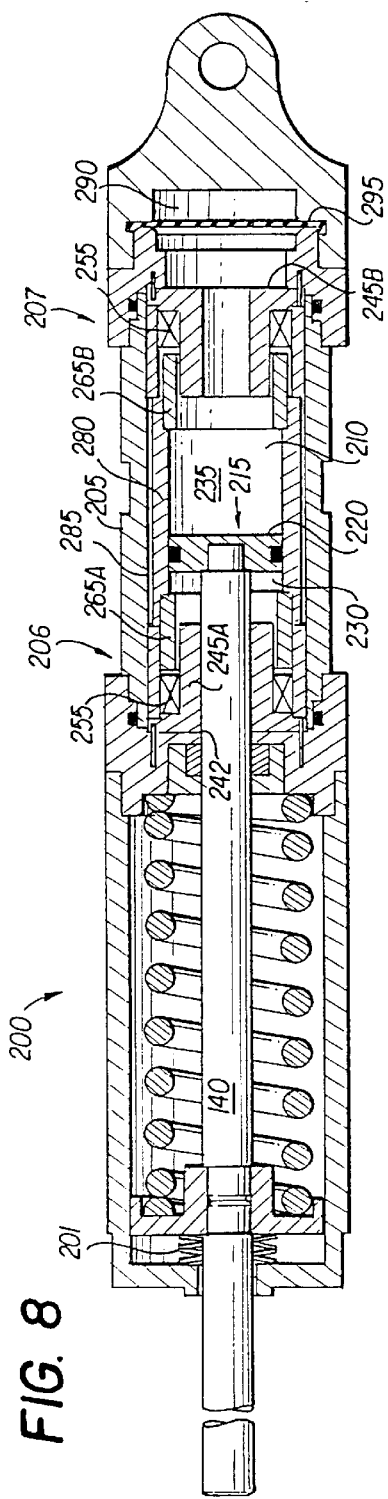
FIG. 8 is a schematic view of an embodiment of a damper according to principles of the invention.

Referring to FIG. 8, an MR damper 200 configured according to the invention includes a cylinder 205, having a first end 206 and a second end 207, that defines a chamber 210 for containing an MR working fluid. A piston 215 has a head 220 that is received in and divides chamber 210 into a first volume 236 and a second volume 235. A piston rod 240 extends from head 220 and through an aperture 242 in a bobbin 245A. Cylinder 205 may be fixed relative to the gun mount or fork F and piston rod 240 may be fixed relative to gun G, as shown in FIG. 1. Damper 200 also includes a recoil spring 201, preferably a plurality of spring washers, that biases piston 215 relative to cylinder 205 into a battery position, as described above with respect to damper 10.

Bobbin 245A is fixed relative to cylinder 205, proximate first end 206. A second bobbin 245B is fixed relative to cylinder 205, positioned generally proximate where head 220 defines the end of the stroke of piston 215.

Figure 9A:
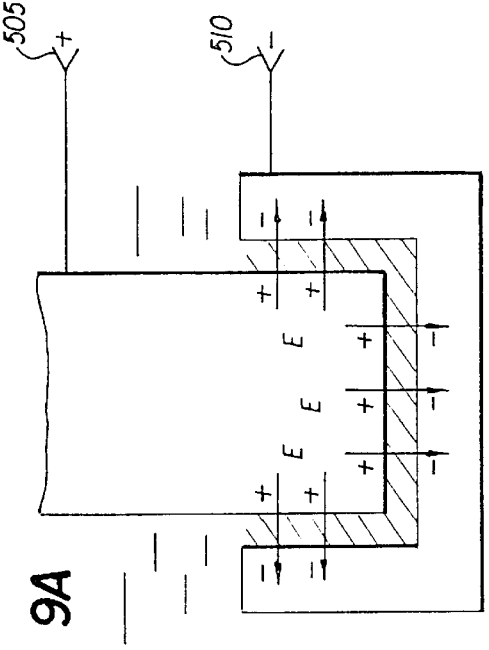
FIG. 9 is a schematic view of a portion within line IX of the embodiment of FIG. 8.
Figure 9:
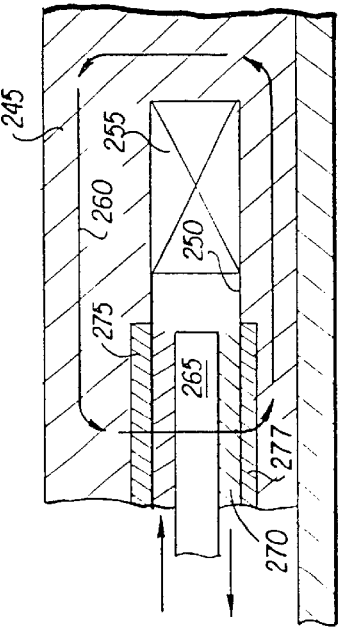

Referring to FIG. 9, each bobbin 245 has a slot 250 for retaining a coil 255. Coil 255 is configured to generate a magnetic field 260. A cylinder extension 265 is received in slot 250 and defines with slot 250 a fluid channel 270. In the cross sections shown, fluid channel 270 has a C shape; in practice, fluid channel 270 defines a C-shaped annulus. Fluid channel 270 conveys MR fluid through a first active region or zone of influence 275 of magnetic field 260 then through a second active region 277 of magnetic field 260. When coil 255 is energized, magnetic field 260 causes the MR fluid within active regions 275 and 277 to assume a higher viscosity, as described above.

An important feature of fluid channel 270 is that fluid channel is configured to convey MR fluid perpendicularly to magnetic field 260. When the MR fluid flows perpendicularly relative to magnetic field 260, magnetic field 260 maximizes influence over the MR fluid. In other words, when magnetic field 260 is perpendicular to MR fluid flow, magnetic field 260 effects the maximum amount of increased dynamic yield stress or apparent viscosity of the MR fluid.

Referring again to FIG. 8, an interior cylinder 280 connects with each cylinder extension 265A and 265B and defines with respect to cylinder 205 a passage 285. Passage 285 is in fluid communication with fluid channels 270 of each bobbin 245A and 245B. Fluid channel 270 of bobbin 245A is in fluid communication with first volume 230 and fluid channel 270 of bobbin 245B is in fluid communication with second volume 235.

In operation, when piston 215 moves relative to cylinder 205, piston head 220 urges MR fluid from, for example, second volume 235 into fluid channel 270 of bobbin 245B. In fluid channel 270, MR fluid passes through first active region 275, flows by coil 255, then passes through second active region 277. MR fluid then exits fluid channel 270 and enters passage 285. From passage 285, the MR fluid enters fluid channel 270 of bobbin 245A. Again, MR fluid passes through first active region 275, loops by coil 255, then passes through second active region 277. MR fluid then exits fluid channel 270 and enters first volume 230.

As shown above, when piston 215 moves, MR fluid must pass through four active regions in which viscosity of the MR fluid therein may be controlled. Unlike other MR dampers, which essentially shear the MR fluid in Couette-type flow, stretching and breaking the magnetic particle "chains" formed due to the magnetic field, fluid channel 270 of the invention has no moving parts. Fluid channel 270 provides for Poiseuille-type flow, wherein hydraulic amplification provides greater damping capabilities.

Another feature of the invention that improves damper efficiency and effectiveness is the disposition of bobbins 245A and 245B having fluid channels 270 on either side of piston head 220. Because fluid channels 270 of bobbins 245A and 245B each can impact MR fluid viscosity, as described above, piston 215 essentially experiences corresponding pushing and pulling resistence. Damping may be advantageously controllable by selectively energization of one or more of coils 255.

Each bobbin 245 and cylinder extension 265 is constructed from a high permeability steel material, such as Hiperco steel, which resists magnetization despite repeated magnetic field exposures. However, as compared with, for example, bobbin 170 of damper 100, bobbin 245 and cylinder extension 265 require far less expensive high permeability steel material, which reduces cost and complexity.

Exemplary, but not limitative, dimensions which damper 200 may have are shown in table 1 below.

TABLE 1

Exemplary Damper Specifications

| Coils | 2 |
|---|---|
| Turns per Coil | 160 |
| Active Length per Coil | 15 mm |
| Gap Thickness | 0.6 mm |
| Piston Diameter | 30.07 mm |
| Total Circuit Length (incl. stroke) | 113.4 mm |
| Outer Diameter of Circuit | 41.28 mm |

Damper 200 may include a pneumatic reservoir 290 separated from chamber 210 by a membrane 295. Pneumatic reservoir 290 is pressurized with a gas, such as ambient nitrogen, which exerts a high pressure against membrane 295 which pressurizes the MR fluid. Pressurizing the MR fluid discourages cavitation which otherwise would occur if sudden movements of piston 215 were allowed to generate a vacuum pressure greater than the vapor pressure of the MR fluid. Cavitation causes the metal parts to corrode and reduces damper operation efficiency. Pneumatic reservoir 290 also accommodates changing shaft volume inside cylinder 205 during damper motion.

An alternative embodiment of the invention may employ an external accumulator. However, experimentation demonstrates that a membrane system, as described above, provides faster response characteristics.

An advantage that damper 200 provides over known dampers is in reducing the number of coils needed to activate the MR fluid. This reduces the overall inductance of the magnetic circuit of damper 200. Consequently, damper 200 is more responsive because reduced magnetic circuit inductance correspondingly reduces the circuit time constant.

Another advantage that damper 200 provides over known dampers is in reducing the overall number of turns in each coil needed to achieve appropriate levels of magnetic field. This also reduces the circuit time constant, allowing faster MR fluid response.

A further advantage that damper 200 provides over known dampers is in increasing the active length of fluid channel 270. This increase in length is achieved by using a C-shaped annular fluid channel 270.

Yet another advantage that damper 200 provides over known dampers is in reduced weight and cost by substantially reducing the volume of high permeability magnetic steel required to provide a selectably activatable active region 190. In the invention, only bobbins 245 and cylinder extension 265 are fabricated from high permeability material. This represents significant reduction as compared with known dampers.

Yet a further advantage that damper 200 provides over known dampers is in increasing mechanical force vs. velocity capabilities by exploiting the hydraulic amplification benefits of Poiseuille-type flow.

Figure 10:
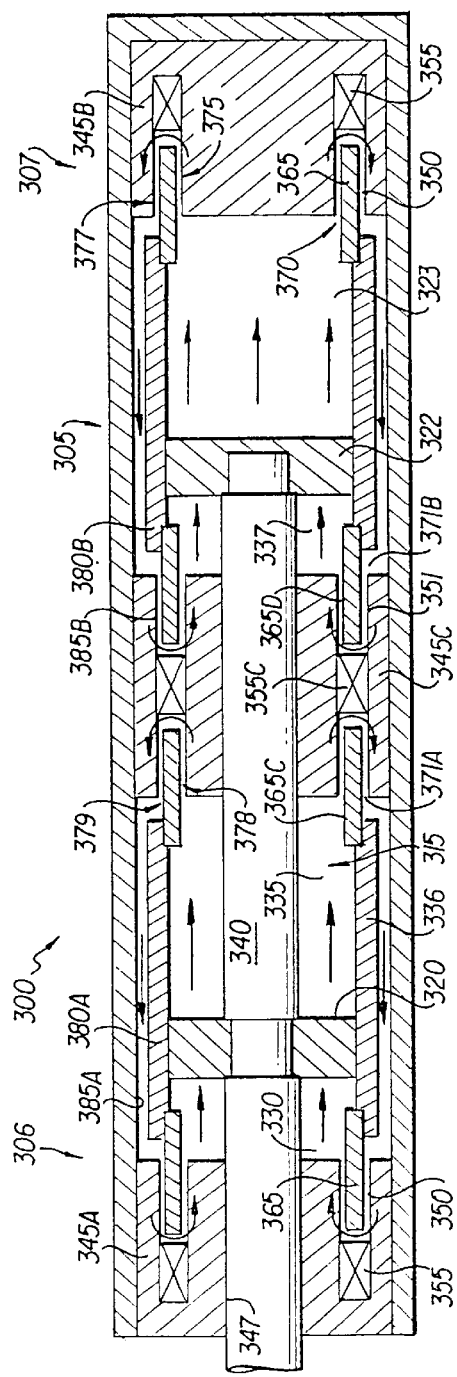
FIG. 10 is a schematic view of another embodiment of a damper according to principles of the invention.

Referring to FIG. 10, an alternative embodiment of the invention is a damper 300 which provides a much higher force capability. Damper 300 configured according to the invention includes a cylinder 305, having a first end 306 and a second end 307, that defines a chamber 310 for containing an MR fluid. A piston 315 has a first head 320 that is received in and divides chamber 310 into a first volume 330 and a second volume 335. A piston 315 has a second head 322 that is received in chamber 310 and further defines in chamber 310 second volume 335 and a third volume 323. A piston rod 340 extends from head 320 and through an aperture 342 in a bobbin 345A. Cylinder 365 may be fixed relative to the gun mount or fork (not shown) and piston rod 240 may be fixed relative to gun (not shown). Damper 300 also includes a conventional recoil spring (not shown) that biases piston 315 relative to cylinder 305 into a battery position.

Bobbin 345A is fixed relative to cylinder 305, proximate first end 306. A second bobbin 345B is fixed relative to cylinder 305, positioned generally proximate where head 322 defines the end of the stroke of piston 315.

Similar to damper 200, each of bobbins 345A and 345B have a slot 350 for retaining a coil 355 which is configured to generate a magnetic field (not shown). A cylinder extension 365 is received in slot 350 and defines with slot 350 a fluid channel 370. In the cross sections shown, fluid channel 370 has a C shape; in practice fluid channel 370 defines a C-shaped annulus. Fluid channel 370 conveys MR fluid through a first active region or zone of influence 375 of the magnetic field then through a second active region 377. When coil 355 is energized, the magnetic field causes the MR fluid within active regions 375 and 377 to assume a higher viscosity, as described above.

Damper 300 also includes a third bobbin 345C having a slot 351 for retaining a coil 355C which is configured to generate a magnetic field (not shown). Bobbin 345C divides third volume 335 into forth and fifth volumes 336 and 337. Cylinder extensions 365C and 365D are received in slot 351 and define with slot 351 two fluid channels 371A and 371B. In the cross sections shown, each of fluid channels 371 have a C shape; in practice fluid channels 371 each define a C-shaped annulus. Fluid channels 371 convey MR fluid through a first active region or zone of influence 378 of the magnetic field then through a second active region 379. When coil 355C is energized, the magnetic field causes the MR fluid within active regions 378 and 379 to assume a higher viscosity, as described above.

A first interior cylinder 380A connects with cylinder extensions 365A and 365C and defines with respect to cylinder 305 a first passage 385A. First passage 385A is in fluid communication with fluid channel 370 of bobbin 345A and fluid channel 371A of bobbin 345C. Fluid channel 370 of bobbin 345A is in fluid communication with first volume 330 and fluid channel 371A of bobbin 345C is in fluid communication with fourth volume 336. A second interior cylinder 380B connects with cylinder extensions 365B and 365C and defines with respect to cylinder 305 a second passage 385B. Second passage 385B is in fluid communication with fluid channel 370 of bobbin 345B and fluid channel 371B of bobbin 345C. Fluid channel 370 of bobbin 345B is in fluid communication with second volume 335 and fluid channel 371B of bobbin 345C is in fluid communication with fifth volume 337.

In operation, for example, when piston 315 moves relative to cylinder 305, piston head 320 urges MR fluid from fourth volume 336 into fluid channel 371A of bobbin 345C, and piston head 322 urges MR fluid from second volume 323 into fluid channel 370 of bobbin 345B. In fluid channels 371A of bobbin 345C and fluid channel 370 of bobbin 345B, MR fluid passes through first active regions 378 and 375, flows by coils 355, then passes through second active regions 379 and 377. MR fluid then exits fluid channels 370 and 371 and enters passages 385A and 385B. From passages 385A and 385B, the MR fluid enters fluid channel 370 of bobbin 345A and fluid channel 371B of bobbin 345C. Again, MR fluid passes through first active regions 378 and 375, flows by coils 355, then passes through second active regions 379 and 377. MR fluid then exits fluid channels 370 and 371B and enters first volume 330 and fifth volume 337.

Central bobbin 345C employs a single coil 355 to activate the MR fluid flowing through two cups or fluid channels 371 and four active regions. More than one MR valve 345C can be ganged together by introducing one or more central bobbin 345C as shown.

Although MR fluids, hence MR dampers, are described, the invention may be adapted for ER fluids, i.e. fluids responsive to electric fields. To this end, for example, referring again to FIG. 9A, a voltage may be applied across the electrodes 505 and 510, thereby establishing an electric field E in the channel causing the viscosity of the ER fluid to change.

The invention also provides a method of damping for managing energy dissipation. As described above, if the amount of recoil energy dissipated is too much, the gum recoil may be insufficient to compress the recoil spring, which in turn may prevent the gun from returning to the battery position. Therefore, unlike previous damping applications and controls therefor, the present method is directed to dissipating an unwanted amount of recoils energy, and preserving a desired amount of recoil energy.

Preferably, the method is based on a mathematical model of the system to be damped which is integrated into a control algorithm. Accordingly, below first describes modeling considerations for a system, for example, a turreted, high-caliber, rapid-fire gun system, then describes various algorithms which may integrate same, and finally explains energy dissipation management and how the method accomplishes same.

Figure 11:
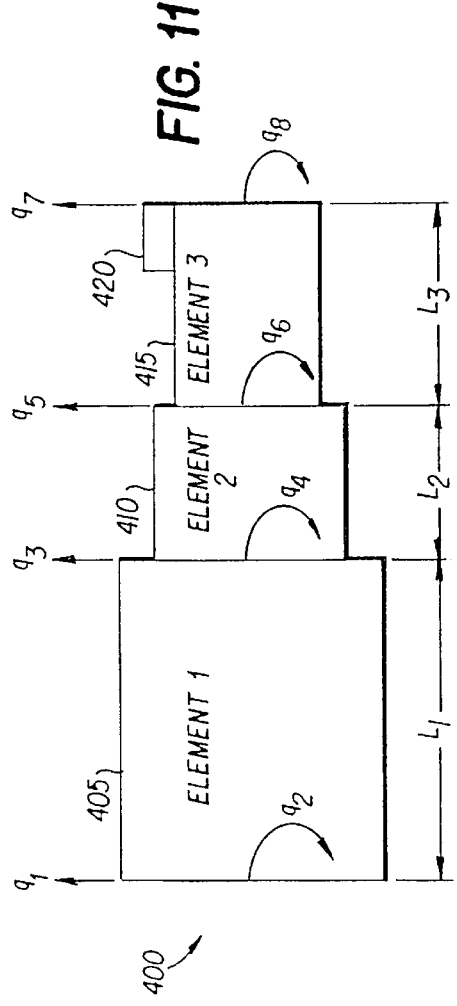
FIG. 11 is a finite element model of a turreted gun system.

FIG. 11 shows turreted gun system modeled with a Finite Element Model (FEM) 400 having three elements 405–415. The simple three-element FEM model of a bending beam may be developed to represent the turret forks with 8 degrees of freedom (DOF). The dynamic response of the Finite Element Model (FEM) of the fork improves by including an assumed half-mass 420 of a gun, which may be assumed to be, for example, 29.5 kg (65 lbs), at the tip.

Exemplary, but not limitative dimensions and moments of inertia for each of the three elements in the model is given below in Table 2.

TABLE 2

Parameters of FEM Elements

| | Element #1 (405) | Element #2 (410) | Element #3 (415) |
|---|---|---|---|
| Length cm(in) | 22.8(9.00) | 7.0(2.75) | 11.74(4.625) |
| Average Width cm(in) | 1.27(0.5) | 1.27(0.5) | 1.27(0.5) |
| Average Height cm(in) | 15.87(6.25) | 12.21(4.81) | 10.0(3.94) |
| Inertia $I_y$ cm$^4$(in$^4$) | 423.28(10.17) | 193.12(4.64) | 105.71(2.54) |

Finite Element Modeling (FEM) of beams is derived using relationships for both the kinetic and potential energy. The potential energy of the system can be written as:

$$V(t) = \frac{1}{2}\int_0^l EI_y(x)\left[\frac{\partial \ddot{w}(x,t)}{\partial x^2}\right]^2 dx = \frac{1}{2}\{w(t)\}^T[K]\{w(t)\} \quad (9)$$

where l is the length of the element, E is the Young's Modulus of the material, and $I_y$ is the bending moment of inertia for each element. Using assumed shape functions for the displacement and bending along the length of an element result in a 4×4 elemental stiffness matrix. The elemental stiffness matrix for a beam in bending is given as:

$$K = 1.0e^9 \begin{bmatrix} 4.14 & .108 & -3.89 & .136 & 0 & 0 \\ .108 & .011 & -.136 & .003 & 0 & 0 \\ -3.89 & -.136 & 4.34 & -.110 & -.448 & .026 \\ .136 & .003 & -.110 & .008 & -.026 & .001 \\ 0 & 0 & -.45 & -.026 & .448 & -.026 \\ 0 & 0 & .026 & .001 & -.026 & .002 \end{bmatrix} \quad (10)$$

An elemental stiffness matrix is composed for each element in the model. These matrices are then used to make a global stiffness matrix. The elemental stiffness matrices are assembled using their connectivity. The resulting matrix is an 8×8 stiffness matrix for the entire beam.

The material properties of the fork are unknown, therefore they must be estimated. Using static test data provided by a gun manufacturer, the Young's Modulus of each fork can be estimated.

Assuming a static load of 13.3 kN (3000 lbs.) In the recoil direction causes a displacement of 1.52 mm (0.06 in.) at the second node of the last element, the FEM beam can be written in vector form written as:

$$F=[000000-13.3*10^3 0]^T \quad (11)$$

Using the global stiffness matrix and the global force vector the equation for a linear spring can be written in matrix form as:

$$[K]\{q\}=\{F\} \quad (12)$$

where q is the global DOF vector. The number of DOFs can now be reduced due to physical constraints applied to the first node of the first element. The DOFs $q_1$ and $q_2$ are set equal to zero because it is assumed that this element node is fixed and cannot move. Therefore, the problem has 6 DOF, hence the global stiffness matrix is reduced to a 6×6 and the force vector is reduced to be 6×1. The reduced global stiffness matrix is written as:

$$[k]_l = \frac{EI_y}{l^3} \begin{bmatrix} 12 & 6l & -12 & 6l \\ 6l & 4l^2 & -6l & 2l^2 \\ -12 & -6l & 12 & -6l \\ 6l & 2l^2 & -6l & 4l^2 \end{bmatrix} \quad (13)$$

Figure 12:
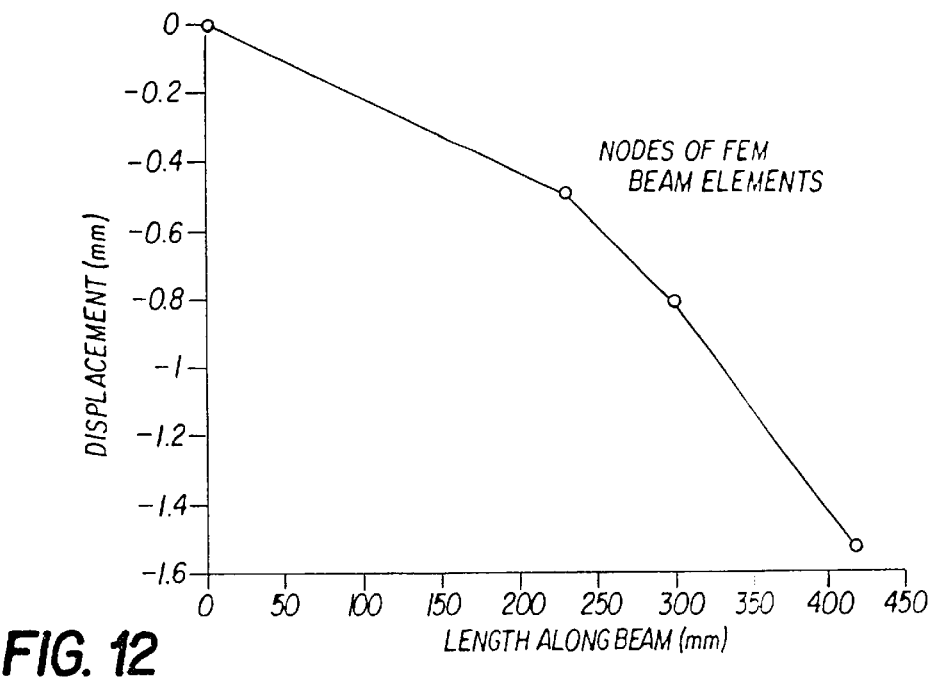
FIG. 12 is a graphical view of displacement vs. beam length of the model of FIG. 11.

The static FEM model is used to determine the apparent Young's Modulus E of the fork material that is unknown. It was assumed that values for the global DOFs were unknown. An initial guess for E was made and values for q were calculated. The final estimate for E was determined by matching the known displacement at the tip of the fork from the static test with the displacement calculated using the FEM model. By matching the tip displacements of the static test and the FEM code the value for the Young's Modulus E of the fork was estimated to be $5.7223 \times 10^{10}$ N/m² ($8.3 \times 10^6$ lb/in²). This value is consistent with that of aluminum or iron alloys. The modeled displacement along the length of the fork due to the applied static load is shown in FIG. 12.

To model the displacement of a gun system when fired, a dynamic FEM model should be used. For the dynamic model the inertial effect of the fork and the gun must be modeled. Like the stiffness of the beam, the mass of the beam can be modeled using FEM theory. This involves deriving an elemental mass matrix using an equation for the kinetic energy of the system. The equation for the element kinetic energy has the form:

$$T(t) = \frac{1}{2} \int_0^l m(x) \left[ \frac{\partial w(x,t)}{\partial t} \right]^2 dx = \frac{1}{2} \{\dot{w}(t)\}^T [m] \{\dot{w}(t)\} \quad (14)$$

The results in an elemental mass matrix for a beam in bending that is given by:

$$[m]_l = \frac{\rho A l}{420} \begin{bmatrix} 156 & 22l & 54 & -13l \\ 22l & 4l^2 & 13l & -3l^2 \\ 54 & 13l & 156 & -22l \\ -13l & -3l^2 & -22l & 4l^2 \end{bmatrix} \quad (15)$$

where $\rho$ is the density of the gun fork material, A is the cross-sectional area of each element, and l is the length of each element. In addition, the inertial half-mass of the gun must be added to the dynamic model. The half-mass of the gun only affects the $q_7$ nodal displacement located in the third element of the model. The inertial effect of the gun mass can be written in matrix form as:

$$m_{g \times s} = \frac{\rho A l}{420} \begin{bmatrix} 0 & 0 & 0 & 0 \\ 0 & 0 & 0 & 0 \\ 0 & 0 & \frac{420m}{\rho A l} & 0 \\ 0 & 0 & 0 & 0 \end{bmatrix} \quad (16)$$

where m is the half-mass of the gun. The elemental mass matrix for the third element and the mass matrix for the gun are added together and used to assemble the global mass matrix. The result is an 8×8 global mass matrix. Once again the global matrix can be reduced from an 8×8 to a 6×6 matrix by applying boundary conditions to the first element. The reduced global mass matrix is written as:

$$M = \begin{bmatrix} 1.52 & -.037 & -.100 & -.002 & 0 & 0 \\ -.037 & .002 & -0.02 & 0.00 & 0 & 0 \\ .100 & .002 & .688 & .004 & .138 & -.004 \\ -.002 & 0.00 & .004 & .0002 & .004 & -.0001 \\ 0 & 0 & .138 & .004 & 29.8 & -.007 \\ 0 & 0 & -.004 & -.0001 & -.007 & .0001 \end{bmatrix} \quad (17)$$

The reduced global stiffness matrix is used with the global reduced mass matrix in the dynamic analysis to write the second order differential equation. The dynamic equation for the system in matrix form is written as:

$$[M]\{\ddot{q}\} + [K]\{q\} = \{F\} \quad (18)$$

The forces applied to the beam are modeled in a force vector. The natural frequencies and mode shapes of the beam can be calculated assuming free vibration conditions, hence no forcing on the system. Using MATLAB, the eigenvalue problem is solved and the analytical mode shapes of the gun fork can be calculated as well as the natural bending frequencies of each mode. The first six natural frequencies calculated using the FEM code for the first beam are given in Table 3.

TABLE 3

Natural Bending Frequencies of Fork Model

| Mode # | Natural Bending Frequency (Hz) |
| --- | --- |
| 1 | 86.5 |
| 2 | 5,114.4 |
| 3 | 8,825.2 |
| 4 | 23,304.0 |
| 5 | 48,540.0 |
| 6 | 106,000.0 |

Figure 13:
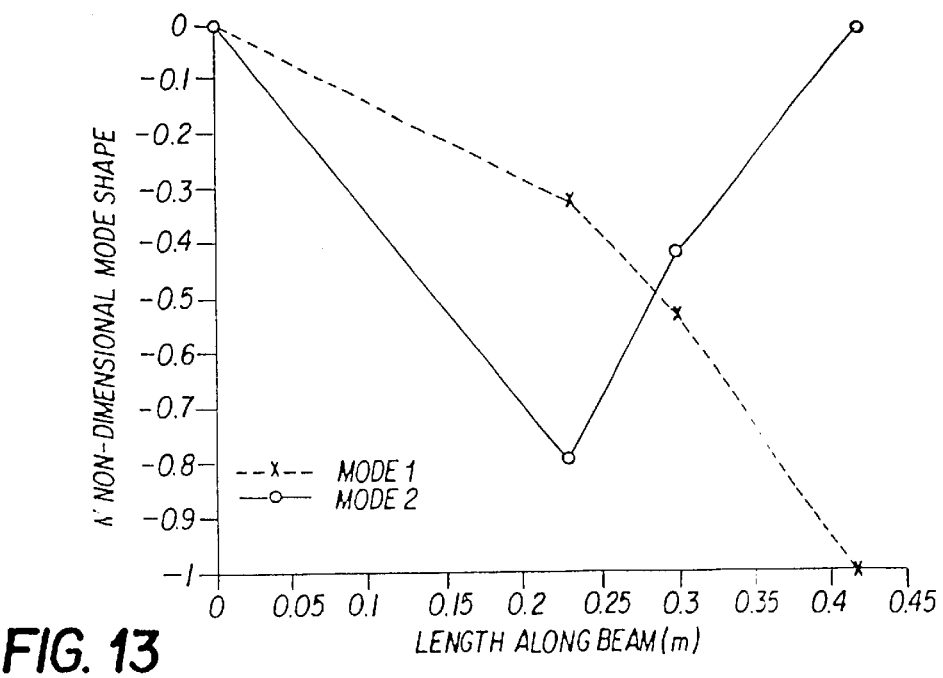
FIG. 13 is a graphical view of mode shape vs. beam length of the model of FIG. 11.

FIG. 13 shows the first two mode shapes calculated for the first beam using the FEM analysis. These mode shapes agree with the mode shapes expected for a beam under free vibration.

The analysis is repeated for the second gun fork. The Young's Modulus E of the second beam is estimated to match the static displacement at the tip of the fork measured by Boeing. The same mass matrix is assumed for both beams. The two modeled beams are used to build a model of gun forks. The forces and displacements generated by the firing of the gun will be transferred to each of the forks through the MR damper.

Figure 14:
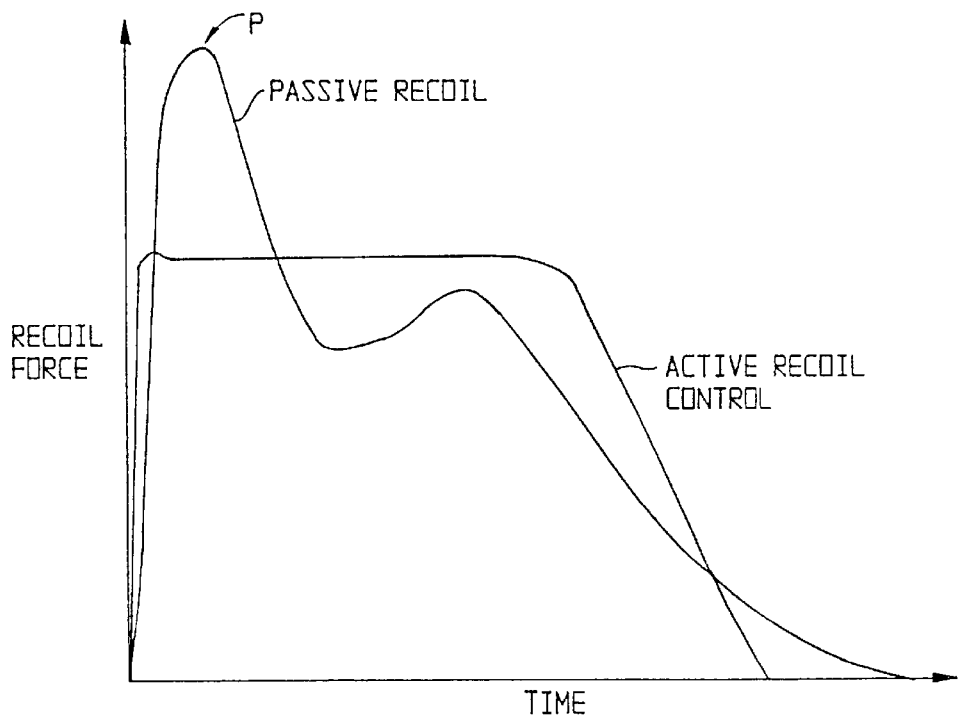
FIG. 14 is a graphical view comparing passive damping vs. active recoil control.

Although different control algorithms and functions may be used, the invention is adapted to reduce peak recoil force and to optimize the recoil cycle force distribution. FIG. 14 compares force profiles of a passive recoil system and a system with active or semi-active control. According to the invention, the active recoil system reduces and more evenly distributes peak force P over the recoil cycle. Active recoil control essentially spreads out the realized recoil force over time. The recoil cycle requires that sufficient energy be injected into the gun system so as to enable recoil, in which a spring a depressed and the energy thus stored is used to propel the gun back into battery to enable the next round to be loaded. A recoil energy of Er is required for proper and efficient gun operation. The firing of a round may inject into the recoil system an energy of Er+Ex, where Ex is considered to be excess or surplus energy, not needed to efficiently enable the recoil cycle of the gun. The excess or surplus energy can be dissipated by the MR recoil dampers because it reduces the structural and vibrational stability of the gun barrel, gun system, and ultimately the vehicle conveying the gun system.

Figure 15:
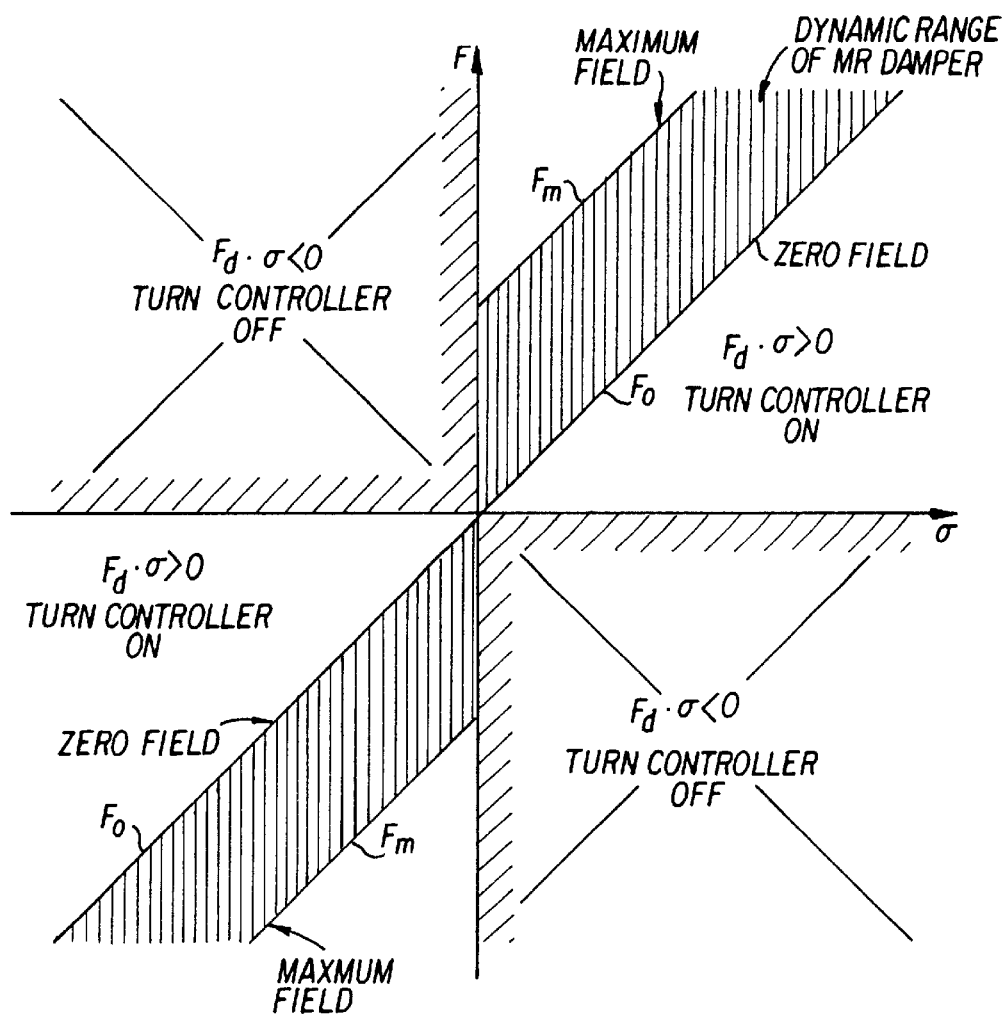
FIG. 15 is a graphical view of a dynamic range of an adjustable damper which may be controlled.
Figure 17:
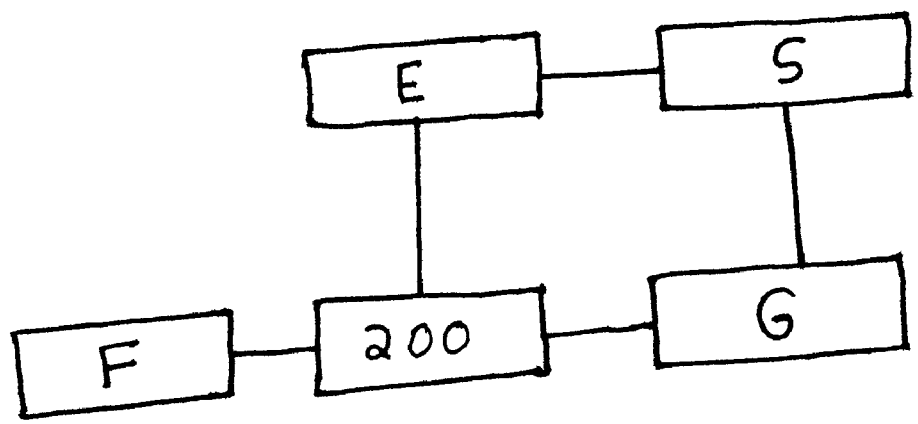
FIG. 17 is an exemplary block diagram of a sensor S and an electrical circuit E operatively coupled to a gun G mounted on a fork F and having a MR damper according to the present invention coupled between gun G and fork F.

Referring to FIG. 15, damper control force $f_d$ is semi-active, because it is purely dissipative. There is only control authority when the desired force and the relative velocity are of the same sign. In addition to this, the damper is limited to operation between performances at field off and saturation. The hatched area between the zero field curve $F_0$ and the maximum field curve $F_M$ represents the operational range of the MR damper as a control actuator on a force vs. velocity diagram.

The invention assumes the Bingham plastic model, as described above, to determine the yield force from the desired damper control force. Given the desired control force $f_d$, the post yield damping $C_{po}$, and the velocity $\dot{u}$, the desired yield force can be found by rewriting Eq. 2 as:

$$F_y = \frac{f_d - C_{po}\dot{u}}{sign(\dot{u})} \quad (19)$$

Since $C_{po}$ is a function of current, $F_y$ is not directly calculated from above equation. For simplicity of calculation, if the value of $C_{yo}$ is determined by using the immediately preceding current input, $F_y$ may be easily determined. The accuracy of this calculation depends on the sampling time. For less calculation error, the sampling time should be as small as possible.

Karnopp et al. developed a simple but effective semi-active control algorithm for controllable dampers known today as skyhook control. This theory realizes the damper as connecting an isolated mass to an inertial reference. This control law essentially switches the damper force onto the desired force when force and velocity have the same sign, and turns the damper off when of opposite signs. This ensures that the force is always dissipative. The skyhook control law can be expressed mathematically as follows:

$$f_d = \begin{cases} f, & f\dot{u}_1 > 0 \\ 0, & f\dot{u}_1 \leq 0 \end{cases} \quad (20)$$

Here, $f$ represents the skyhook control force. In Karnopp's skyhook control theory, $f$ would be proportional to the absolute velocity of the first floor, $\dot{u}_f + \dot{u}_g$:

$$f = K_{Sky}(\dot{u}_f + \dot{u}_g) \quad (21)$$

where $K_{Sky}$ is the control gain. The ground velocity is obtained by numerically integrating the measured ground acceleration.

When applying skyhook control to FEM model 400 described above, it is necessary to consider damper lockup, which may occur using the classical method. To remedy this, a modified skyhook control is proposed wherein Eq. 5 is rearranged as:

$$f_y = \beta M_f \ddot{u}_f \quad (21)$$

which then is substituted into the Bingham-plastic approximation (Eq. 2) to give the skyhook control force:

$$f = C_{po}(\dot{u}_f + \dot{u}_g) + \beta M_f \ddot{u}_f sign(\dot{u}_f + \dot{u}_g) \quad (22)$$

Here, $f$ still is a function of the absolute velocity, and a value of 0.7 is used for $\beta$, the ratio of the yield or coulomb force of the damper to the input force or recoil force, so the damper should never lock up.

One of the most widely used techniques of linear control systems design is the optimal linear quadratic regulator (LQR). The basis for LQR is to find the control such that the cost function $$J = \int_0^\infty [x^T Q x + rf^2(t)] dt \quad (23)$$

is minimized. Here Q=I and r=1. The control law that minimizes the cost function is given by linear-state feedback:

$$f = K_{LQR} x \quad (24)$$

The control gain $K_{LQR}$ is given by:

$$K_{LQR} = -B^T P \quad (25)$$

where $P \in R^{6 \times 6}$ is the solution to the control algebraic Riccati equation:

$$A^T P + PA + I - PBB^T P = 0 \quad (26)$$

To make this controller dissipative, a semi-active condition must be combined with this LQR control. This semi-active condition is very similar to that used in the skyhook control law and ensures that the force is always dissipative:

$$f_d = \begin{cases} f, & f\dot{u}_1 > 0 \\ 0, & f\dot{u}_1 \leq 0 \end{cases} \quad (27)$$

To evaluate the effect of more complex controllers, Continuous Sliding Mode (CSM) control must be considered. CSM control is similar to its predecessor, Variable Structure-Sliding Mode (VSSM). In these methods, the controller is allowed to change its structure and combine their individual useful properties. The controller then forces the trajectory of the structure to follow a specified sliding surface. Although VSSM and other classical sliding mode control algorithms are well known to be very robust to parameter variation and disturbances, their switching nature causes serious problems of chattering. CSM was introduced to completely eliminate this chattering problem while still maintaining the stability and robustness of VSSM. To obtain the CSM control input with the full-state feedback and no disturbance, Eq. 14 can be rewritten as:

$$\dot{x} = Ax + Bf \quad (28)$$

Since the ultimate goal is to regulate the vibration of this system, we define the appropriate linear sliding surface function:

$$s(x) = p_1 x_1 + p_2 x_2 + \ldots + p_6 x_6 = p^T x \quad (29)$$

where $p^T$ is the sliding surface gradient vector.

A number of methods exist to determine the sliding surface, including classical pole placement methods as well as optimal control strategies. The invention employs an algorithm based upon eigenstructure assignment. Then, the CSM controller that satisfies the sliding mode condition, $s\dot{s} < 0$, is proposed:

$$f = -(\Delta + \epsilon p^T B P^T) x \quad (30)$$

where, $$\Delta = (p^T B)^{-1} p^T A \qquad (31)$$

and $\epsilon$ is the sliding margin (>0). For the invention, $\epsilon=1$. A and B are the system matrices previously described in Eq. 14.

The stability of the total system can be established using Lyapunov stability criterion. A positive definite Lyapunov function $V=\frac{1}{2}(s^2)$ is defined. The time derivative of this function is seen to be the sliding mode condition:

$$\begin{aligned}\dot{V} = s\dot{s} &= sp^T(Ax+Bf) \\ &= sp^T B\left[(p^T B)^{-1} p^T A x + f\right] \\ &= -\varepsilon(sp^T B)^2 < 0.\end{aligned} \qquad (32)$$

This shows that meeting the sliding mode condition guarantees stability.

CSM has been designed for a filly active system and has been shown to work well for seismic applications with actuators that can operate in all quadrants of FIG. 15. For optimal control, in order to apply this control law to a semi-active MR damper case, a semi-active condition similar to the skyhook method must be added to the CSM:

$$f_d = \begin{cases} f, & f\dot{u}_1 > 0 \\ 0, & f\dot{u}_1 \le 0 \end{cases} \qquad (33)$$

This again turns the controller on only when the force is dissipative.

Figure 16:
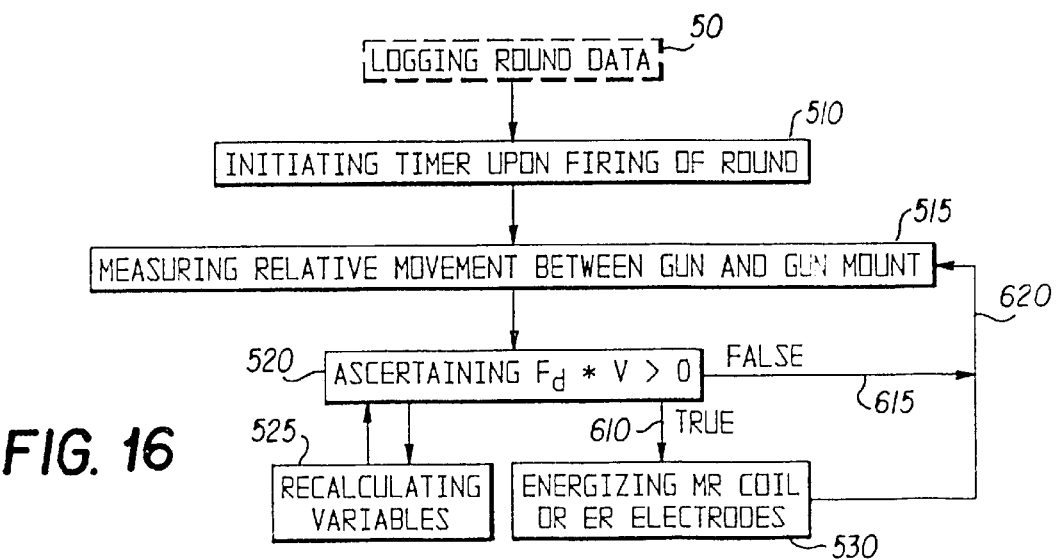
FIG. 16 is a method of managing energy dissipation according to the invention.

Referring to FIG. 16, based on the model and control algorithms described above, at step S10, the method of the invention includes initiating a timer in a controller upon the firing of a round. The controller, thus being provided with the capability of measuring a duration associated with gun recoil, can ascertain characteristics of the realized recoil, as well as damping exerted by damper 200 or 300, as shown respectively in FIGS. 8 and 10, between gun G and forks F, as shown in FIG. 1.

At step S15, the method includes measuring relative movement between gun G and the gun mount or forks F. Step S15 may include measuring one or more of displacement, velocity and acceleration.

At step S20, the method determines an appropriate damping control force using control algorithms, with consideration made to maintaining a sufficient recoil energy in the gun system. To this end, the method includes ascertaining whether Fd*v>0, as described above. If the expression is true, control passes along control line C10 to step S30. If the expression is false, control passes along control line C15 to control line C20, then back to step S15, as described above. Thus, whether or not control passes to step S30, described below, the method involves continuously measuring relative movement between gun G and forks F, first, to ascertain realized recoil forces, and to monitor the amount of damping exerted between gun G and forks F. Monitoring the amount of damping exerted permits the controller to adjust in real time the amount of damping exerted to dissipate the surplus energy in the recoil cycle.

At step S25, the method includes recalculating variables impacted by the time and movement measurements ascertained in previous steps, and retaining the variables for subsequent calculations at step S20.

At step S30, the method includes energizing an MR coil or ER electrodes to impact the viscosity of the respective MR or ER fluid in the damper according the amount calculated in step S20.

Preliminary to step S10, at step S0, the method may include an optional step of logging round data in the controller. Data, such as temperature, age, maker or other data, may influence the force developed from recoil. Logging may include assessing a round, for example, measuring the temperature or, through bar code scanning, evaluating other properties. Adjustments may be made to the damping control force at this time to ensure that sufficient energy is injected into the recoil system, or to reduce the surplus energy in the recoil system, based on logged round data.

The invention is not limited to the particular embodiments described herein, rather only to the appended claims.

We claim:

1. Gun system comprising:

a gun;

a gun mount; and means for dissipating energy of a force exerted by said gun against said gun mount;

a sensor responsively connectable to the gun for producing a signal indicative of recoil force produced by the gun; and an electrical circuit responsively connectable to the sensor and operatively connectable to the means for dissipating energy for producing an output signal having a selected output level, and being operative for activating fluid in the means for dissipating energy in accordance with the level of the output signal and for varying in real time the viscosity characteristic of the fluid and thereby varying the dissipating characteristic of the means for dissipating, wherein said means for dissipating is adjustable for dissipating different amounts of energy.

2. Gun system of claim 1, wherein said means for dissipating comprises:

a cylinder;

a piston defining in said cylinder a first volume and a second volume;

a first fluid channel for one or both of providing fluid to and evacuating fluid from the first volume;

first means for regulating flow through said first fluid channel;

a second fluid channel for one or both of providing fluid to and evacuating fluid from the second volume; and second means for regulating flow through said second fluid channel;

wherein said first fluid channel and said second fluid channel are in fluid communication.

3. Gun system of claim 2, wherein one or both of said first fluid channel and said second fluid channel define a C-shaped annulus.

4. Gun system of claim 2, wherein one or both of said first means for regulating and said second means for regulating comprise:

means for generating an electric field, fixed relative to said cylinder; and said respective first or second fluid channels configured to be influenced by the electric field, for one or both of providing fluid to and evacuating fluid from the respective first volume or second volume.

5. Gun system of claim 4, the fluid being an electrorheological fluid in at least one of said first and second fluid channels.

6. Gun system of claim 4, wherein at least one of said first and second fluid channels is configured to be perpendicular to the electric field.

7. Gun system of claim 2, wherein one or both of said first means for regulating and said second means for regulating comprise:
   a coil, fixed relative to said cylinder, configured to generate a magnetic field; and
   said respective first or second fluid channels configured to be influenced by the magnetic field, for one or both of providing fluid to and evacuating fluid from the respective first volume or second volume.

8. Gun system of claim 7, the fluid being a magnetorheological fluid in at least one of said first and second fluid channels.

9. Gun system of claim 7, wherein at least one of said first and second fluid channels is configured to be perpendicular to the magnetic field.

10. Gun system of claim 7, further comprising:
    a bobbin having a slot for receiving said coil; and
    a cylinder extension defining at least one of said first and second fluid channels with said bobbin and said coil.

11. A control system for controlling recoil forces produced in an automatic rapid fire gun mounted on a support and having a damper having a variable damping characteristic mounted between the gun and the support, said damper employing an electrically active working fluid having a variable viscosity characteristic responsive to a level of an applied electrical signal, and wherein the fluid exhibits a first viscosity characteristic when electrically activated by an electrical signal of a first level and exhibiting a second viscosity characteristic lower than the first viscosity characteristic when deactivated, said viscosity characteristic varying between said first and second in accordance with the output level of the applied signal comprising:
    a sensor responsively coupled to the gun for producing signal indicative of the recoil force produced by the gun,
    an electrical circuit responsively coupled to the sensor and operatively coupled to the damper for producing an output signal having a selected output level, and being operative for activating the fluid in accordance with the level of the output signal, for varying in real time the viscosity characteristic between the first and second viscosity characteristics of the fluid and thereby varying the damping characteristic of the damper.

12. The control system of claim 11, wherein said sensor ascertains force, displacement, acceleration or combinations thereof.

13. The control system of claim 11, wherein the gun has a plurality of operational characteristics each operative for affecting gun operations further including a sensor for each operational characteristic being operatively coupled to the circuit, said circuit being responsive to the sensors for varying the electrical output signal in accordance therewith.

14. A variable recoil damper mounted for selectively varying, in real time, damping forces produced therein for controlling recoil forces in between an automatic rapid fire gun mounted for relative movement in a frame, comprising:
    a closed cylinder and a piston reciprocally mounted therein and being secured between the gun and the frame, said piston and cylinder defining in the cylinder a first chamber and a second chamber and a passageway in fluid communication between first and second chambers;
    electrically energizeable winding located in operative relation with the passageway, said winding when energized producing a magnetic field in the passageway;
    an electrically active fluid in the cylinder, said fluid having a selectively variable viscosity operative for controlling the damping forces in accordance with a selected viscosity, said fluid having a first viscosity in response to the magnetic field in the passageway when the winding is energized and a second viscosity, lower than the first viscosity, in response to the absence of the magnetic field when the winding is deenergized, said damping forces increasing with increasing viscosity;
    a sensor responsively connectable to the gun for producing a signal indicative of the recoil forces produced by the gun; and
    an electrical circuit responsively connectable to the sensor and operatively connectable to the damper for producing an output signal having a selected output level, and being operative for activating the fluid in the cylinder in accordance with the level of the output signal and for varying in real time the viscosity characteristic of the fluid and thereby varying the damping characteristic of the damper.

15. A method for selectively controlling, in real time, recoil characteristics of an automatic, rapid fire gun supported for relative movement in a frame, comprising the steps of:
    providing a variable damper having a damping rate being selectable in real time between the gun and the frame, said damper including a closed cylinder and a piston reciprocally mounted therein and being secured between the gun and the frame, said piston and cylinder defining in the cylinder a first chamber and a second chamber and a passageway in fluid communication between first and second chambers, electrically energizeable winding located in operative relation with the passageway, said winding when energized producing a magnetic field in the passageway, and an electrically active fluid in the cylinder, said fluid having a selectively variable viscosity operative for controlling damping forces in accordance with a selected viscosity, said fluid having a first viscosity in response to the magnetic field in the passageway when the winding is energized and a second viscosity, lower than the first viscosity, in response to the absence of the magnetic field when the winding is deenergized, said damping forces increasing with increasing viscosity;
    ascertaining recoil characteristics of the gun by connecting a sensor to the gun for producing a signal indicative of recoil forces produced by the gun; and
    controlling the damping rate in real time based on the ascertained recoil characteristics of the gun by an electrical circuit responsively connectable to the sensor and operatively connectable to the damper for producing an output signal having a selected output level, and being operative for activating the fluid in the cylinder in accordance with the level of the output signal and for varying in real time the viscosity characteristic of the fluid and thereby varying the damping characteristic of the damper.

16. Method of claim 15, further comprising controlling the damping rate based on characteristics of a round.

* * * * *